United States Patent
Kim

(10) Patent No.: US 9,384,306 B2
(45) Date of Patent: Jul. 5, 2016

(54) METHOD OF SEARCHING ADDRESS BOOK AND PORTABLE COMMUNICATION DEVICE USING THE SAME

(75) Inventor: Jung-Hak Kim, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 973 days.

(21) Appl. No.: 12/342,538

(22) Filed: Dec. 23, 2008

(65) Prior Publication Data

US 2009/0192995 A1   Jul. 30, 2009

(30) Foreign Application Priority Data

Jan. 29, 2008   (KR) .................. 10-2008-0009176

(51) Int. Cl.
*G06F 7/00* (2006.01)
*G06F 17/30* (2006.01)

(52) U.S. Cl.
CPC ................ *G06F 17/30988* (2013.01)

(58) Field of Classification Search
CPC ....... G06F 17/30988; G06F 7/06; G06F 7/08; G06F 7/24
USPC ................ 707/752, 748, 800, 726, 999.003
See application file for complete search history.

(56) References Cited

U.S. PATENT DOCUMENTS

| | | | |
|---|---|---|---|
| 6,502,090 B1 * | 12/2002 | Raisanen | 707/721 |
| 7,221,748 B1 * | 5/2007 | Moore et al. | 379/142.15 |
| 7,499,538 B2 * | 3/2009 | Kusaka et al. | 379/355.09 |
| 2002/0198027 A1 * | 12/2002 | Rydbeck | 455/564 |
| 2004/0070571 A1 * | 4/2004 | Woodard et al. | 345/173 |
| 2004/0102225 A1 * | 5/2004 | Furuta et al. | 455/566 |
| 2005/0037816 A1 * | 2/2005 | Morita et al. | 455/566 |
| 2005/0171933 A1 * | 8/2005 | Stepanich et al. | 707/3 |
| 2007/0025704 A1 * | 2/2007 | Tsukazaki et al. | 386/96 |
| 2007/0156686 A1 * | 7/2007 | Kim et al. | 707/7 |
| 2007/0156747 A1 * | 7/2007 | Samuelson et al. | 707/102 |
| 2008/0020736 A1 * | 1/2008 | Kim et al. | 455/412.1 |
| 2008/0033946 A1 * | 2/2008 | Bhogal et al. | 707/7 |
| 2008/0057926 A1 * | 3/2008 | Forstall et al. | 455/415 |
| 2008/0146190 A1 * | 6/2008 | Kister | 455/405 |
| 2008/0208812 A1 * | 8/2008 | Quoc et al. | 707/3 |

FOREIGN PATENT DOCUMENTS

| | | |
|---|---|---|
| JP | 2003-264621 A | 9/2003 |
| KR | 10-2004-0026716 A | 4/2004 |
| KR | 2005-20165 | 3/2005 |
| KR | 2005-102741 | 10/2005 |
| KR | 10-2007-00065682 A | 6/2007 |

OTHER PUBLICATIONS

Korean Office Action issued Jan. 29, 2014 in counterpart Korean Patent Application No. 10-2008-0009176 (6 pages in Korean).
Korean Office Action mailed Jul. 26, 2014 in counterpart Korean Application No. 10-2008-0009176 (9 pages, Korean with English language translation).

* cited by examiner

*Primary Examiner* — Mohammed R Uddin
(74) *Attorney, Agent, or Firm* — NSIP Law

(57) ABSTRACT

A method of searching an address book and a portable communication device using the same, the method including: arranging an address book based on a character selected from information being displayed on the portable communication device; and displaying the arranged address book.

28 Claims, 6 Drawing Sheets

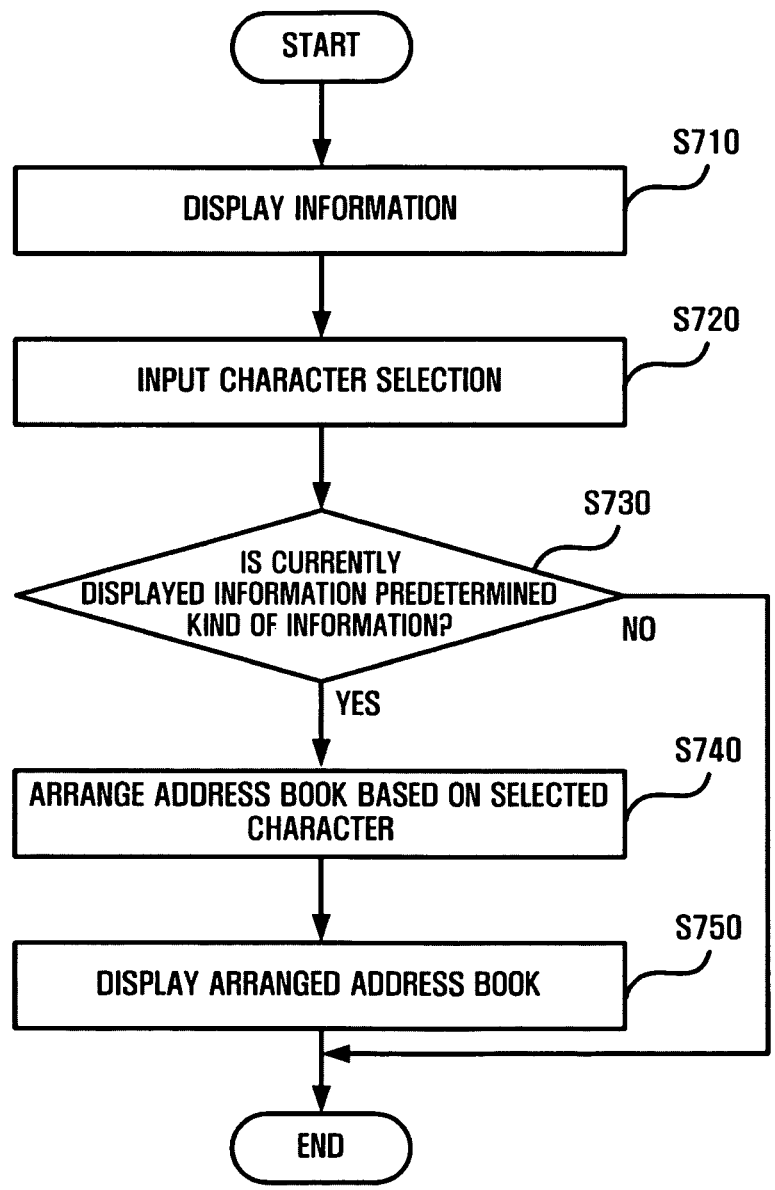

METHOD OF SEARCHING ADDRESS BOOK AND PORTABLE COMMUNICATION DEVICE USING THE SAME

CROSS-REFERENCE TO RELATED APPLICATION

This application claims all benefits accruing under 35 U.S.C. §119 from Korean Patent Application No. 2008-9176, filed on Jan. 29, 2008 in the Korean Intellectual Property Office, the disclosure of which is incorporated herein by reference.

BACKGROUND OF THE INVENTION

1. Field of the Invention

Aspects of the present invention relate to a portable communication device, and more particularly, to an address book search in a portable communication device.

2. Description of the Related Art

With the continued development of mobile communication technologies, the spread of portable communication devices (such as cellular phones, personal digital assistants (PDAs), code division multiple access (CDMA) terminals, and etc.) has increased. Furthermore, a user can input and store many phone numbers in a portable communication device, and the portable communication device provides an address book operation to search the stored phone numbers. Accordingly, direct dialing without an input of a phone number is possible.

In a conventional portable communication device providing the address book operation, a process of searching and dialing a specified phone number is performed as follows. First, a user executes a menu mode of the portable communication device by manipulating a function button or a menu button provided on the portable communication device, and selects an address book search operation by using a direction button or a numeral button. Then, the user searches for a desired phone number by scrolling the address book using the direction button or inputting a name to be searched.

The address book operation provided in the conventional mobile phone requires several button manipulations, resulting in an inconvenience to the user. In addition, as the number of stored phone numbers increases, time and effort required to search the stored phone numbers also increases.

SUMMARY OF THE INVENTION

Accordingly, aspects of the present invention provide a portable communication device and method to facilitate a search of an address book stored in the portable communication device.

Additional aspects and/or advantages of the invention will be set forth in part in the description which follows and, in part, will be obvious from the description, or may be learned by practice of the invention.

In accordance with an example embodiment of the present invention, there is provided a method of searching an address book for a portable communication terminal. Such a method includes: arranging the address book based on a character selected from information displayed on the portable communication terminal; and displaying the arranged address book.

In accordance with another example embodiment of the present invention, there is provided a portable communication device. Such a portable communication device includes a control unit to arrange an address book based on a character selected from displayed information; and a display unit having a user interface installed to provide a visual display of the arranged address book, and to enable a user to request the arranging of the address book.

In accordance with another example embodiment of the present invention, there is provided a portable communication device. Such a portable communication device includes: a control unit to arrange the address book based on a character selected from information being displayed; and a display unit having a user interface installed to provide a visual display of the arranged address book, and to enable a user to request the arranging of the address book, wherein the displayed information is an originating call list, a terminating call list, a call list including both the originating call list and the terminating call list, or the address book.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

FIG. 7 is a flowchart illustrating a process of searching an address book according to another example embodiment of the present invention.

DETAILED DESCRIPTION OF THE EMBODIMENTS

Figure 1:
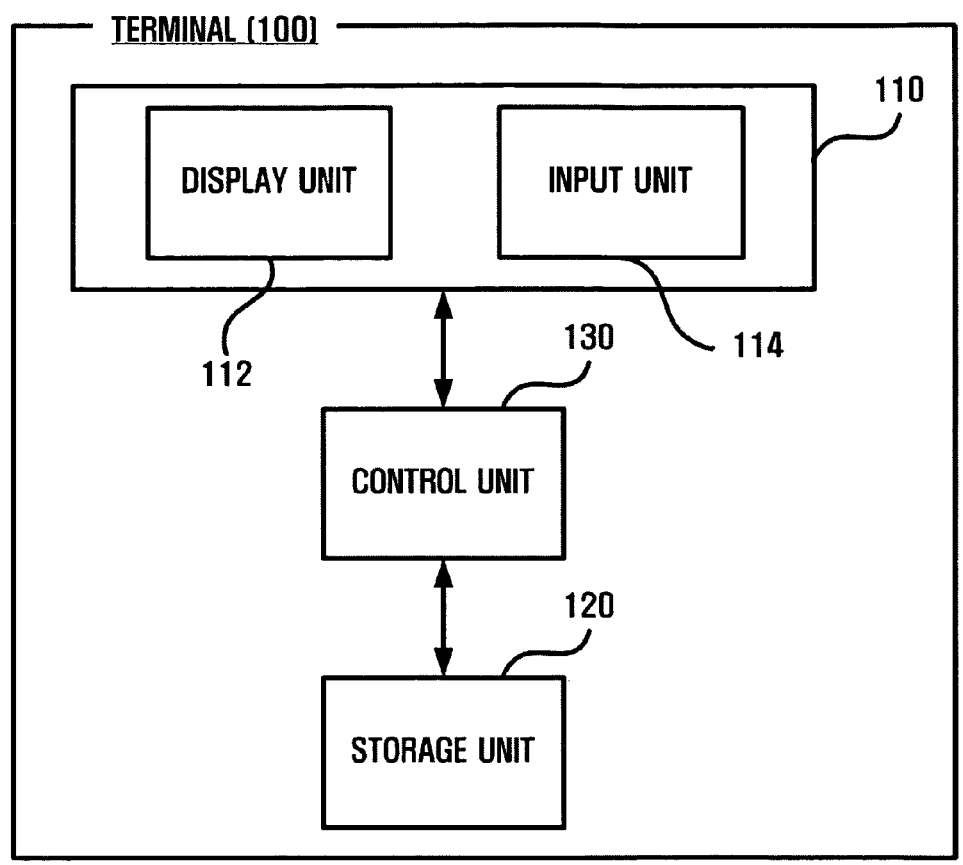
FIG. 1 is a block diagram illustrating a construction of a portable terminal according to an example embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram illustrating a construction of a portable terminal 100 according to an example embodiment of the present invention. The portable terminal 100 is a handheld computer or an information processing device having a data storage operation and a digital operation. Furthermore, the portable terminal 100 may be a mobile device (such as a portable phone, a personal digital assistant (PDA), a portable multimedia player (PMP), etc.). The portable terminal 100 includes a user interface 110 and a storage unit 120.

The user interface unit 110 performs an information transfer operation between a user and the portable terminal 100. Specifically, the user interface 110 displays results of a data processing of the portable terminal 100, and receives an input from a user. That is, the user can manipulate the portable terminal 100 through the user interface 110, and confirm information (for example, that a certain operation has been performed, or the results of an operation).

The user interface 110 includes a display unit 112 and an input unit 114. The display unit 112 may be implemented by a flat display device (such as a liquid crystal display (LCD), an organic electro luminescence display (organic EL), etc.). It is understood that the display unit 112 and the input unit 114 may not be physically separated. For example, the user interface 110 may be implemented in a manner such that the input unit 114 and the display unit 112 are organically integrated (for example, a touch screen including a touch panel and a display).

The storage unit 120 stores therein various information, such as call histories, short messages sent or received, an address book, and various kinds of information inputted in accordance with the user's request. Here, the address book includes names of calling and called parties (e.g., names of persons and/or companies) and corresponding contact points (e.g., phone numbers and/or e-mail addresses). In addition, the storage unit 120 stores programs used to perform or control various operations of the portable terminal 100 and data. For this, the storage unit 120 includes a memory, which may be a volatile memory (such as RAM) or a non-volatile memory (such as ROM, flash memory, or a hard disk drive).

The control unit 130 arranges the address book stored in the storage unit 120 based on characters selected by the user from information displayed through the user interface 110. Specifically, the arranged address book is transferred to the user interface 110, and the user interface 110 displays the transferred address book. In addition, the control unit 130 controls the operation of constituent elements of the portable terminal 100.

Although not illustrated in the drawings, the portable terminal 100 may further include constituent elements used to perform various other operations. For example, in the case where the portable terminal 100 is a portable phone, the portable terminal 100 may further include a microphone, a speaker, a wireless communication unit, etc.

The elements constituting the portable terminal 100 as illustrated in FIG. 1 may be implemented by modules. In the embodiment of the present invention, the term "module", as used herein, refers to, but is not limited to, a software or hardware component, such as a Field Programmable Gate Array (FPGA) or Application Specific Integrated Circuit (ASIC), which performs certain tasks. A module may be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented so as to execute one or more central processing units (CPUs) in a device or a security multimedia card.

Figure 2:
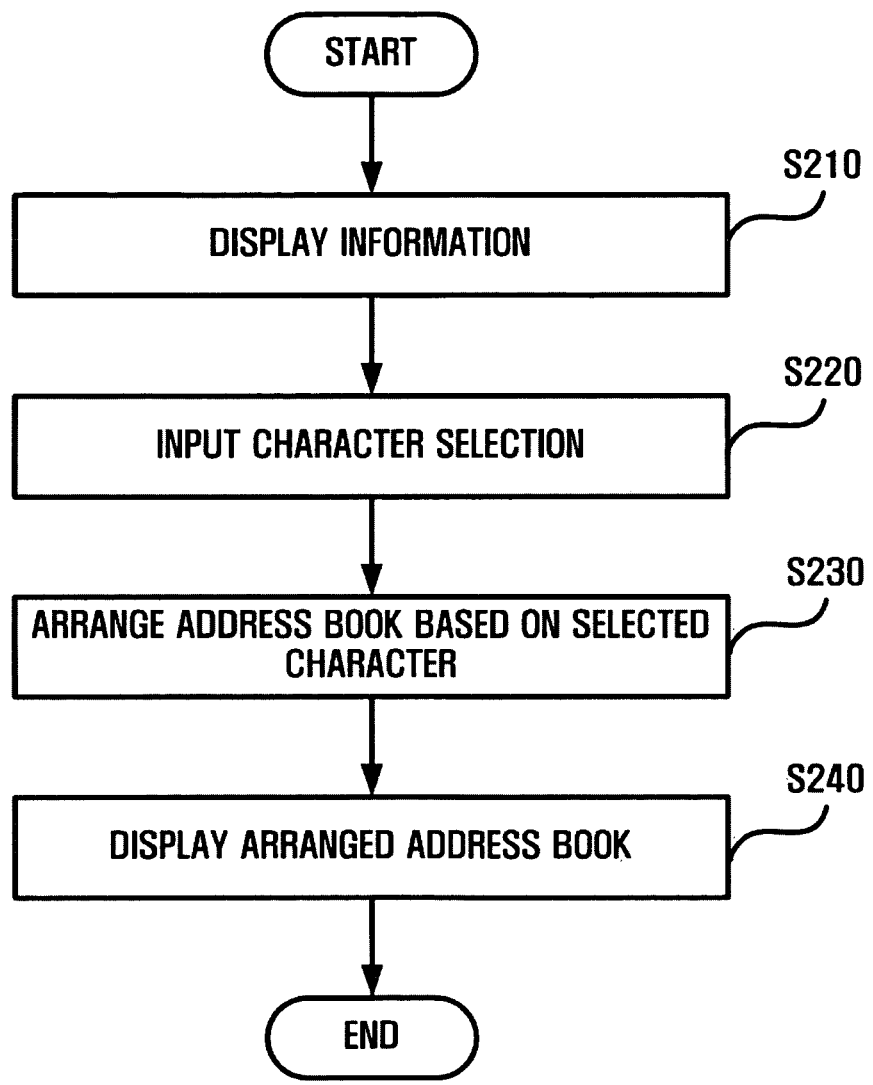
FIG. 2 is a flowchart illustrating a process of searching an address book of a portable terminal according to an example embodiment of the present invention.
Figure 3:
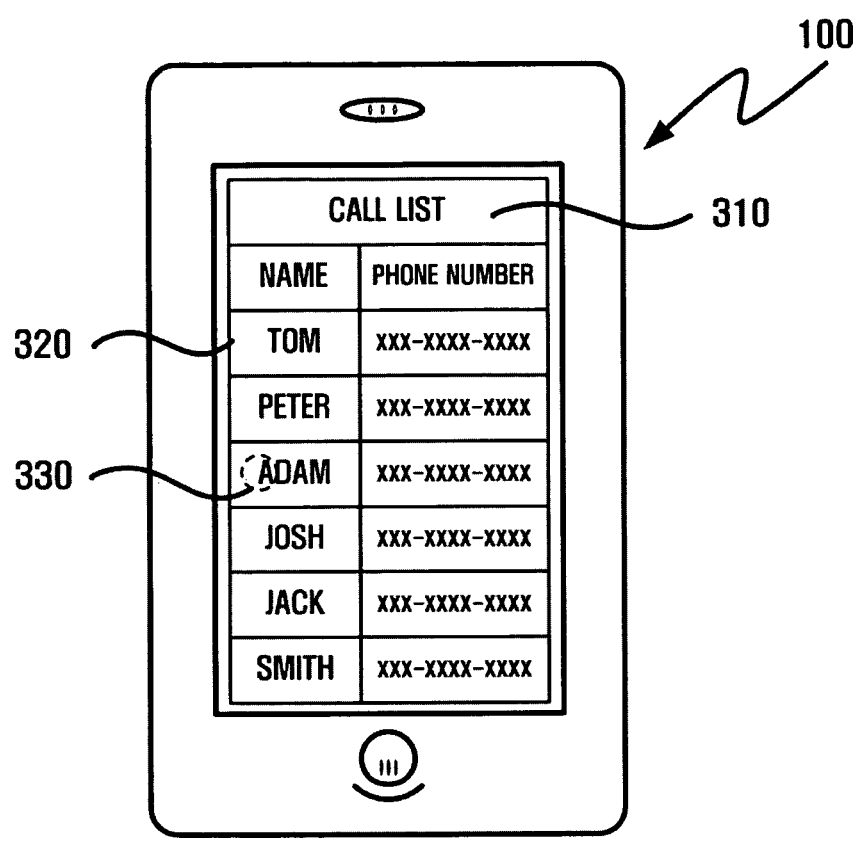
FIG. 3 is a view explaining a call list according to an example embodiment of the present invention.

Hereinafter, a method of searching an address book by using the portable terminal 100 as illustrated in FIG. 1 will be described in more detail. FIG. 2 is a flowchart illustrating a process of searching an address book of a portable terminal 100 according to an example embodiment of the present invention. Referring to FIG. 2, the display unit 112 displays information corresponding to a current operation of the portable terminal 100 in operation S210. For example, the display unit 112 may display a call list 310, as illustrated in FIG. 3. The call list 310 may include data in which user's call information (e.g., names and phone numbers of opposite parties having made calls) is arranged in time order based on start or end time points of calls. Referring to FIG. 3, the information (call list 310), displayed through the display unit 112, includes names of calling and called parties. That is, at least one character 330 is included in the information being displayed. A user who desires to search the address book can select the character 330 to be the basis of the address book search from the information being displayed through the display unit 112.

In an embodiment of the present invention, the input unit 114 and the display unit 112 are integrated and implemented by a touch screen that is a bidirectional input device. In this case, the user can select a desired character by clicking a position where the character is displayed on a display screen of the portable terminal 100 with a pointing tool (such as a finger, a stick, a pen, etc.). On the other hand, in the case where the input unit 114 is physically distinct from the display unit 112 and is implemented, for example, by buttons, dials, and/or a touchpad, the user can select a desired character by pushing the buttons (e.g., a direction button, a function button, or a combination thereof) or by moving a cursor being displayed on the screen through dragging of the pointing tool on the touchpad.

When the input unit 114 confirms the input of a user's request for a character selection in operation S220, the control unit 130 arranges the address book stored in the storage unit 120 on the basis of the selected character in operation S230. For example, the control unit 130 searches and arranges the address book including names that start with the selected character in operation S220. Accordingly, if the user selects a character "A" 330 on the screen, the control unit 130 arranges the address book including the names starting with "A". However, it is understood that aspects of the present invention are not limited thereto. For example, the control unit 130 may arrange the names starting with the selected character, in addition to and preceding all other names of the address book in operation S220. Moreover, if there is no name starting with or including the selected character, the control unit 120 may arrange names starting with or including the closest character to the selected character in the order of characters. Alternatively, if there is no name starting with or including the selected character, the control unit 130 may output a message, displayed on a screen by the display unit 112, to report the absence of names starting with or including the selected character.

Figure 4:
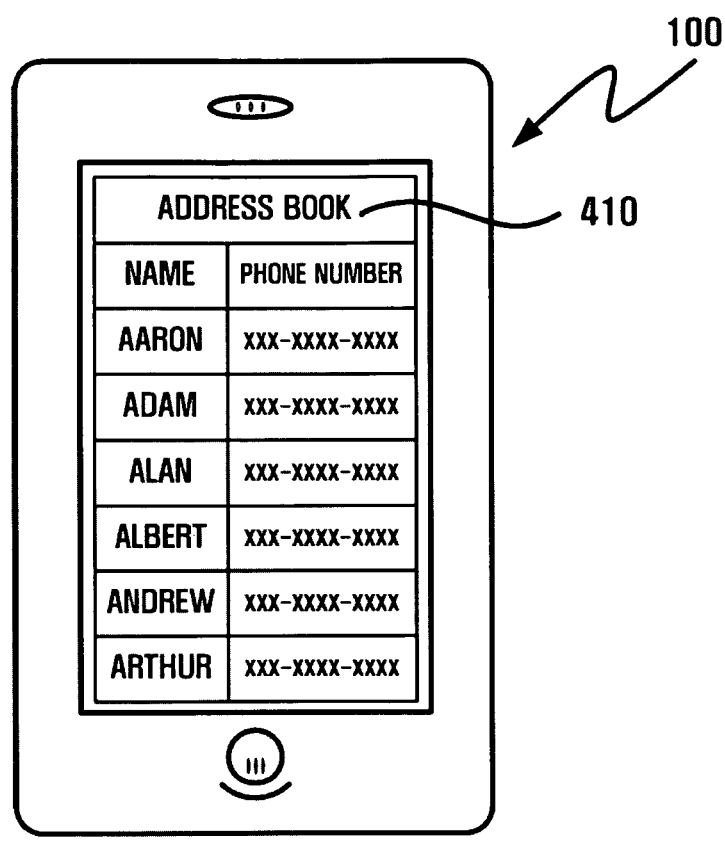
FIG. 4 is a view explaining address book search results according to an example embodiment of the present invention.

The display unit 112 displays the arranged address book in operation S240. For example, if the user selects the character "A" 330 on the screen as illustrated in FIG. 3, the portable terminal 100 arranges and displays an address book 410 that includes names starting with "A," as illustrated in FIG. 4. Although the address book illustrated in FIG. 4 is arranged in the descending order of characters, it is understood that aspects of the present invention are not limited thereto. For example, the address book 410 that is displayed on the screen of the portable terminal 100 may be arranged in the ascending order of characters or in another type of arrangement method.

An example of a method, in which the portable terminal 100 confirms a character selected by the user and arranges an address book in accordance with the selected character, may be a method using hypertext. In this case, the information being displayed through the display unit 112 in operation S210 of FIG. 2 is prepared in hypertext. That is, respective characters in the information being displayed through the display unit 112 may be linked to corresponding names or instructions. For example, characters "T", "O", and "M" of the name "TOM" 320 in the call list 310 as illustrated in FIG. 3 may be linked to different names respectively starting with the corresponding characters, respectively. As an example of a link method, the character "T" may be mapped on link information, such as <herf:menu="address book" sortfrom="T" sort="descending order">, and the character "O" may be mapped on link information, such as <herf:menu="address book" sortfrom="O" sort="descending order">.

Figure 5:
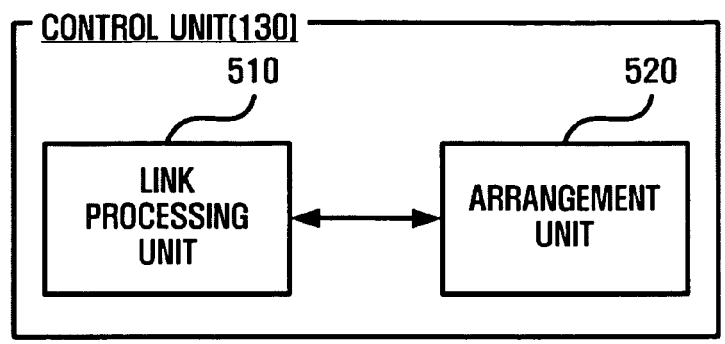
FIG. 5 is a view illustrating a construction of a control unit of a portable terminal according to an example embodiment of the present invention.

In order to use the hypertext, the control unit 130 of the portable terminal 100 includes a link processing unit 510 and an arrangement unit 520, as illustrated in FIG. 5. The link processing unit 510 constructs the information to be displayed through the display unit 112 in hypertext. That is, the link processing unit 510 generates link information corresponding to the respective characters of the information to be displayed, and performs mapping of the link information on the respective characters. If the user selects the character from the displayed information, the link processing unit 510 provides the link information of the selected character to the arrangement unit 520. At this time, the control unit 520 arranges the address book in accordance with the link information provided from the link processing unit 510, and provides the arranged address book to the display unit 112.

Figure 6:
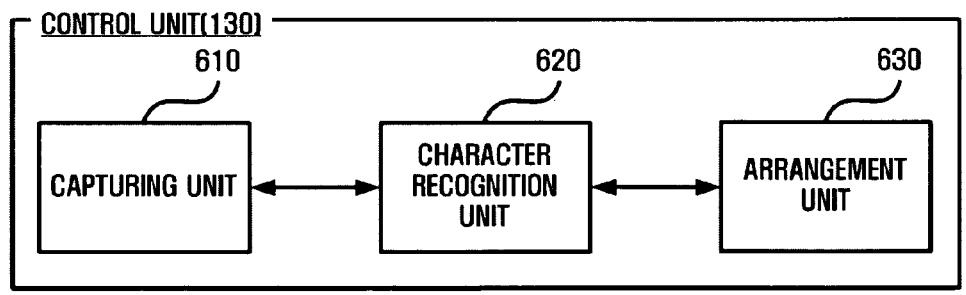
FIG. 6 is a view illustrating a construction of a control unit of a portable terminal according to another example embodiment of the present invention.

FIG. 6 is a view illustrating a construction of a control unit of a portable terminal 100 according to another example embodiment of the present invention. In the example embodiment illustrated in FIG. 6, the portable terminal 100 operates to search an address book by using a character recognition operation. For this, the control unit 130 includes a capturing unit 610, a character recognition unit 620, and an arrangement unit 630.

The capturing unit 610 captures an image in a predetermined range around a point selected by the user on the screen of the portable terminal 100 (e.g., a point on the touch screen that is in contact with the pointing tool). The size of an area captured by the capturing unit 610 is predetermined to correspond to the size of the respective characters being currently displayed.

The character recognition unit 620 recognizes the character included in the image captured by the capturing unit 610. For example, the character recognition unit 620 calculates feature data of the image transferred from the capturing unit 610, and searches for the character having the same feature data as the calculated feature data in a specified error range. The feature data may include coordinate data and stroke data of the character. Furthermore, inherent feature data of various kinds of characters and character codes corresponding to the feature data may be stored in the storage unit 120. An example of the character code may be an ASCII code.

The arrangement unit 630 arranges the address book based on the character recognized by the character recognition unit 620, and provides the arranged address book to the display unit 112.

It is understood that aspects of the present invention are not limited to the methods using the hypertext and the character recognition as described above. Accordingly, it should be understood that other methods of confirming the character selected by the user and arranging the address book based on the confirmed character are also within the scope of aspects of the present invention.

In the example embodiment of the present invention illustrated in FIG. 2, the portable terminal 100 searches the address book irrespective of the kind of information being displayed through the portable terminal 100. However, in the case where the portable terminal 100 is in a specified operational mode (i.e., if the portable terminal 100 displays a predetermined kind of information), the address book search operation may be operated as described above.

Time to activate the address book search operation may differ according to the kind of information being displayed. However, since there is a high probability that the user searches the address book while information related to the address book is displayed, the address book search operation may be activated as described above when any one of a call list, an originating call list including information on originating calls, and a terminating call list including information on terminating calls is displayed. Furthermore, the address book search operation may be activated when the address book is displayed.

Also, in the case of using the method using hypertext as described above, the predetermined information may be prepared in hypertext, but it is understood that other information may not be prepared in hypertext. In the case of using the character recognition as described above, the character recognition operation is performed in accordance with a user's input when the predetermined information is displayed, while the character recognition operation may be intercepted even if the user's input is made when other information is displayed.

FIG. 7 is a flowchart illustrating a process of searching an address book according to another example embodiment of the present invention. Specifically, a method of activating the address book search operation according to the kind of information being displayed through the portable terminal 100 is illustrated in FIG. 7. Referring to FIG. 7, if the input unit 114 confirms a user's input for selecting a character (e.g., if the touch screen of the portable terminal 100 senses the contact of the pointing tool) in operation S720 in a state that the display unit 112 displays information corresponding to the current function of the portable terminal 100 in operation S710, the control unit 130 determines whether the information being currently displayed is the predetermined kind of information in operation S730.

If the information being currently displayed is the predetermined kind of information (operation S730), the control unit arranges the address book in operation S740 based on the selected character input in operation S720, and the display unit 112 displays the arranged address book in operation S750. By contrast, if the information being currently displayed is not the predetermined kind of information (operation S730), the control unit 130 disregards the input through the input unit 114 in operation S720, or controls the portable terminal 100 so that an operation corresponding to the current operational mode is performed in accordance with the input through the input unit 114.

As described above, in the method of searching an address book and a portable communication device using the same according to aspects of the present invention, the search of the address book stored in the portable communication device can be easily performed.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, the portable communication device may include a storage unit to store the address book, or may only display an address book that is accessed from a server or another device. Furthermore, the arranged address book may firstly display names corresponding to the selected character, or may only display names corresponding to the selected character. Accordingly, it is intended, therefore, that the present invention not be limited to the various example embodiments disclosed, but that the present invention includes all embodiments falling within the scope of the appended claims.

What is claimed is:

1. A method of searching an address book in a portable communication terminal, the method comprising:
   detecting a touch input of at least one character displayed on a touch screen, wherein the at least one character is associated with a call list;
   generating a link information corresponding to the detected at least one character;
   performing a search function of the address book by using the link information on the detected characters;
   arranging the address book in accordance with arrangement instructions linked to the detected character,
   wherein each individual detected character of a name in the call list linked to different contact name respectively, starting with the first corresponding detected character of a name,
   mapping each detected character of a name on link information on the address book and sorting the name associated with detected character in descending order; and
   displaying the searched address book in accordance with the link information,
   wherein the link information is set for activating the search function of the address book.

2. The method as claimed in claim 1, wherein the searched address book firstly lists names starting with the detected character.

3. The method as claimed in claim 1, wherein the information displayed on the touch screen is an originating call list, a terminating call list, a call list including both the originating call list and the terminating call list, or the address book.

4. The method as claimed in claim 1, wherein:
   the at least one character displayed on the touch screen is linked to corresponding arrangement instructions.

5. The method as claimed in claim 4, wherein the at least one character included in the displayed information is a hypertext character.

6. The method as claimed in claim 1, wherein the detecting a touch input comprises:
   capturing an image within a predetermined range around a point selected by a user on the touch screen; and
   recognizing a character included in the captured image as the detected character.

7. The method as claimed in claim 1, wherein the arranging of the address book comprises arranging the address book in a descending-order arrangement or an ascending-order arrangement in accordance with an order of characters.

8. The method as claimed in claim 1, wherein the at least one character is detected through an input on the touch screen.

9. The method as claimed in claim 1, wherein the arranged address book only lists names starting with the detected at least one character.

10. The method as claimed in claim 1, further comprising:
    disregarding the detected at least one character in response to the detected at least one character not being from a predetermined information.

11. The method as claimed in claim 1, wherein the touch screen comprises a display unit to display the information and an input unit, physically distinct from the display unit, to receive an input of at least one character selected from the displayed information.

12. The method as claimed in claim 1, wherein the arranging of the address book comprises arranging the address book according to a next character to the detected at least one character in response to the address book not including any names starting with the detected at least one character or any names including the detected at least one character.

13. A non-transitory computer-readable recording storage medium storing a program comprising:
    detecting a touch input of at least one character displayed on a touch screen, wherein the at least one character is associated with a call list;
    generating a link information corresponding to the detected characters;
    performing a search function of the address book by using the link information on the detected characters;
    arranging the address book in accordance with arrangement instructions linked to the detected character,
    wherein each individual detected character of a name in the call list linked to different contact name respectively, starting with the first corresponding detected character of a name,
    mapping each detected character of a name on link information on the address book and sorting the name associated with detected character in descending order; and
    displaying the searched address book in accordance with the link information,
    wherein the link information is set for activating the search function of the address book.

14. The method as claimed in claim 1, wherein the at least one character displayed on the touch screen is included in a predetermined information, the predetermined information comprising a link mapped to the detected at least one character.

15. The method as claimed in claim 1, wherein the detecting of the touch comprises detecting a finger touch or a stick touch.

16. The method as claimed in claim 1, further comprising activating the portable communication terminal based on a predetermined information.

17. A portable communication device providing an electronic address book, the portable communication device comprising:
    an input unit configured to detect a touch of at least one character displayed on a display, wherein the at least one character is associated with a call list;
    a processor configured to generate a link information corresponding to the detected characters, and perform a search function of the electronic address book in accordance with the detected at least one character, acid-arrange the electronic address book in accordance with arrangement instructions linked on the detected at least one character wherein each individual detected character of a name in the call list linked to different contact name respectively, starting with the first corresponding detected character of a name, and map each detected character of a name on link information on the address book and sorting the name associated with detected character in descending order; and the display configured to display the electronic address book, wherein the link information is set for activating a search function of the address book.

18. The portable communication device as claimed in claim 17, wherein the arranged electronic address book firstly lists names starting with the detected character.

19. The portable communication device as claimed in claim 17, wherein the displayed information is an originating call list, a terminating call list, a call list including both the originating call list and the terminating call list, or the address book.

20. The portable communication device as claimed in claim 17, wherein:

the at least one character displayed on the display is linked to corresponding arrangement instructions.

21. The portable communication device as claimed in claim 20, wherein the at least one character included in the displayed information is a hypertext character.

22. The portable communication device as claimed in claim 17, wherein the processor comprises:

a capturing unit configured to capture an image within a predetermined range of a point of the touch;

a character recognition unit configured to recognize a character included in the captured image as the detected character; and an arrangement unit configured to arrange the electronic address book based on the recognized character.

23. The portable communication device as claimed in claim 17, wherein the processor is configured to arrange the electronic address book in a descending-order arrangement or an ascending-order arrangement in accordance with an order of characters.

24. The portable communication device as claimed in claim 17, wherein the display is a touch screen, and the at least one character is detected through an input on the touch screen.

25. The portable communication device as claimed in claim 17, wherein the arranged electronic address book only lists names starting with the detected at least one character.

26. The portable communication device as claimed in claim 17, wherein the processor configured to disregard the detected at least one character if the detected at least one character is not from a predetermined information.

27. The portable communication device as claimed in claim 17, further comprising an input unit, physically distinct from the display, configured to receive an input of at least one character selected from the displayed information.

28. The portable communication device as claimed in claim 17, wherein the processor is configured to arrange the electronic address book according to a next character to the detected at least one character in response to the electronic address book not including any names starting with the detected at least one character or any names including the detected at least one character.

* * * * *